United States Patent [19]
Ames et al.

[11] Patent Number: 5,396,241
[45] Date of Patent: Mar. 7, 1995

[54] METHOD AND APPARATUS FOR DIGITALLY CONTROLLED LINEARIZATION OF AN ANALOG SIGNAL

[75] Inventors: Gregory H. Ames; Austin L. Widener, both of Colorado Springs, Colo.

[73] Assignee: Kaman Instrumentation Corporation, Colorado Springs, Colo.

[21] Appl. No.: 12,648

[22] Filed: Feb. 3, 1993

[51] Int. Cl.[6] ............................................. H03M 1/06
[52] U.S. Cl. ....................................... 341/118; 341/110
[58] Field of Search ..................... 341/118, 155, 110

[56] References Cited

U.S. PATENT DOCUMENTS

| | | | |
|---|---|---|---|
| 4,625,240 | 11/1986 | Yablonski et al. | 358/143 |
| 4,803,461 | 2/1989 | Yamaguchi et al. | 341/118 X |
| 4,807,146 | 2/1989 | Goodrich et al. | 341/144 X |
| 4,912,468 | 3/1990 | Rust | 341/118 X |
| 5,196,851 | 3/1993 | Patel et al. | 341/118 X |
| 5,298,898 | 3/1994 | Brunheim | 341/118 |

*Primary Examiner*—Sharon D. Logan
*Attorney, Agent, or Firm*—Sughrue, Mion, Zinn, Macpeak & Seas

[57] ABSTRACT

A method and apparatus for linearizing an analog signal. The signal is converted into a digital form and digital gain and offset words are fetched based upon the value of the measurement signal and any other parameters which affect linearity, such as temperature for example. The digital gain and offset words are converted to analog values and inserted into an analog signal path of the measurement signal.

13 Claims, 2 Drawing Sheets

METHOD AND APPARATUS FOR DIGITALLY CONTROLLED LINEARIZATION OF AN ANALOG SIGNAL

BACKGROUND OF THE INVENTION

1. Field of the Invention

The subject invention relates to a method and apparatus for correcting nonlinearities in an analog signal. In particular, the invention is a method and apparatus for correcting nonlinear signals which uses digital techniques to adjust offset and gain while maintaining an entirely analog signal path.

2. Description of the Related Art

In many analog sensors (such as inductive position sensors, for example) the output is nonlinear over the operable range thereof. Linearization is often accomplished by reducing the range to one over which the sensor is substantially linear. However this reduced range limits the application of the sensor. Also, it is known to provide analog correcting circuits, such as log amps, to process the sensor output into a linear signal. However, this approach reduces the stability and increases the calibration difficulty of the circuit due to the introduction of additional analog components into the measuring circuit.

Certain modern manufacturing processes, such as positioning a photomask on a semiconductor during chip manufacturing, require that position measurement signals have linearities which are within one percent over a wide operating range. This has conventionally been accomplished by converting the analog measurement signal to a digital form and then processing it digitally before converting it back to an analog output. This method can be undesirable in that the resolution of the system is limited to that of the A/D and D/A converters. Also, a significant phase delay is introduced to the system due to processing time.

SUMMARY OF THE INVENTION

It is an object of the invention to linearize an analog signal without adding phase delay, drift, or instability.

It is a further object of the invention to linearize an analog signal without limiting the resolution thereof.

It is a further object of the invention to provide a linearizing circuit which will not interfere with the throughput of the measurement signal if components of the linearizing circuit fail.

It is yet a further object of the invention to provide linearization for signals having nonlinearities which are not easily defined algorithmically.

In order to achieve the above-mentioned objectives, the subject invention inserts digitally generated corrections to an analog signal path. A sensor, or the like, is electrically connected to a digitally controlled gain and offset amplifier. The signal path through the gain and offset amplifier is analog. In addition, the sensor is coupled to a digital processor through an A/D convertor. The digital processor is also supplied with a digital temperature signal.

Based upon the measurement signal and the temperature signal, the digital processor calculates gain and offset adjustments which are input into the gain and offset amplifier. The gain and offset amplifier converts the digital gain and offset adjustments to a linear form and inserts them into the analog signal path so as to linearize the analog measurement signal. Gain and offset values can be stored in a look-up table in a memory associated with the digital processor. The values in the look-up table can be calculated experimentally or empirically and downloaded utilizing a personal computer which is interfaced to the digital processor.

In the subject invention, the signal path is entirely analog; no conversion of the signal takes place in the signal path. Because only the gain and offset are calculated digitally, the speed at which the digital processing occurs affects only the linearization update rate and does not contribute to delay in the analog output signal. In addition, complex linearization algorithms can be easily accomplished by storing the proper values in the look-up table.

DETAILED DESCRIPTION OF THE PREFERRED EMBODIMENT

Figure 1:
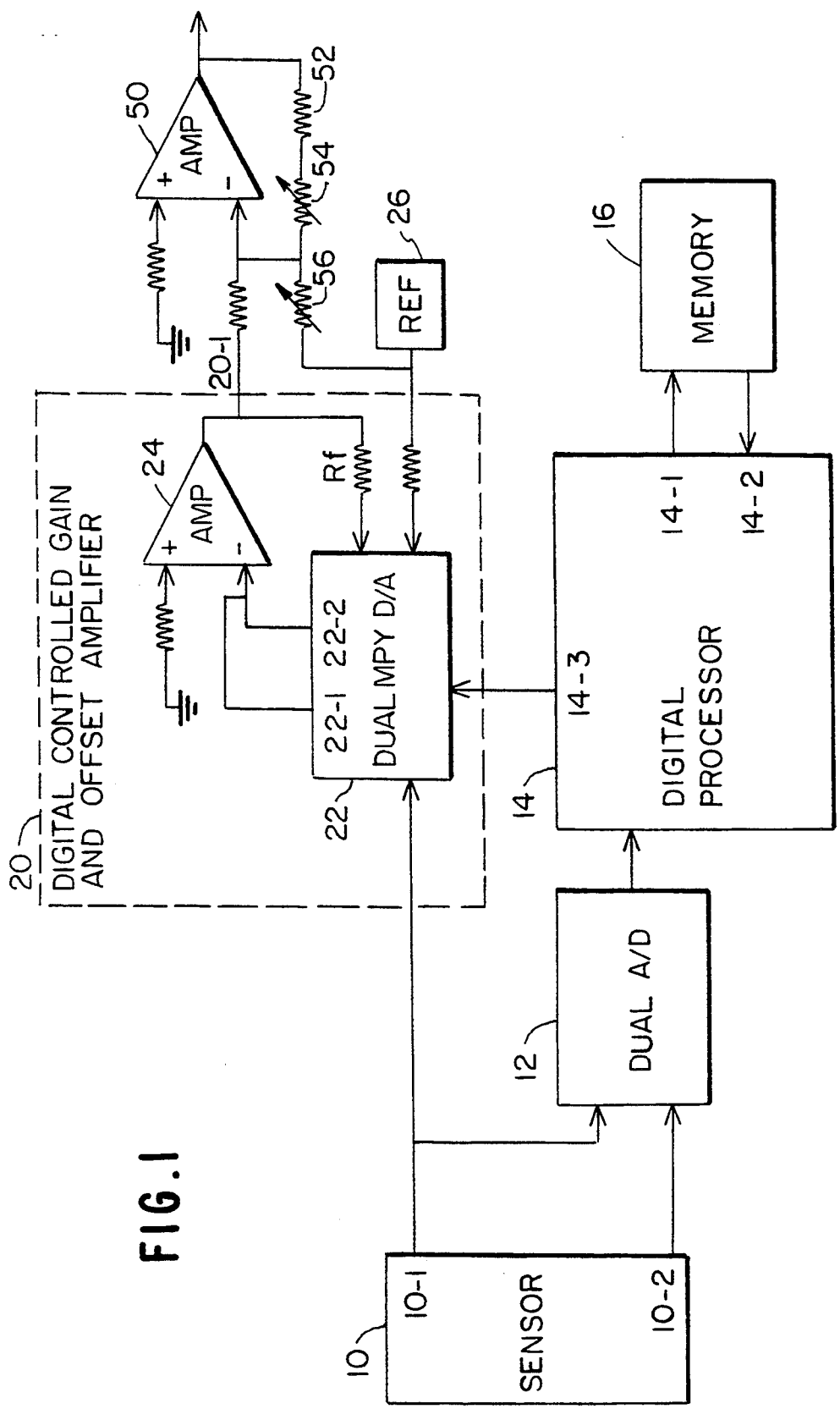
FIG. 1 is a schematic representation of the preferred embodiment of the invention.

FIG. 1 illustrates a preferred embodiment of the invention which is utilized to correct a distance measurement from an inductive sensor which outputs a nonlinear analog measurement signal and an analog temperature correction signal.

Sensor 10 outputs a nonlinear analog measurement signal, which is representative of a distance between sensor 10 and a target object (not illustrated), at terminal 10-1. Sensor 10 also outputs an analog temperature signal, which will be utilized to correct the measurement signal for drift, at terminal 10-2. Copending application Ser. Number 08/013,061 discloses such a sensor capable of generating both measurement and temperature signals. In the alternative, a separate temperature probe, which is disposed proximate the sensor, may be utilized.

Terminal 10-1 is electrically connected to a first input of dual A/D convertor 12 and an input of digitally controlled gain and offset amplifier 20. Terminal 10-2 is connected to a second input of A/D convertor 12. A/D convertor 12 converts the analog temperature and measurement signals into a digital form for processing by digital processor 14. Digital processor 14 fetches the proper gain and offset correction data from memory 16 (such as a programmable read only memory (PROM), for example) based upon the levels of the measurement and temperature signals. This procedure will be discussed in greater detail below.

The correction data is then output from communications port 14-3 into digitally controlled gain and offset amplifier 20. The construction and operation of gain and offset amplifier 20 is also discussed in greater detail below. It is important to note that the signal path for the measurement signal through gain and offset amplifier is entirely analog. Gain and offset amplifier 20 converts the gain and offset data, output from port 14-3, into analog form and inserts the gain and offset into the analog signal path so as to correct the measurement signal for nonlinearities and drift. The corrected signal is outputted at terminal 20-1 and can be subsequently amplified by an external amplification circuit, which consists of op amp 50, resistor 52 and variable resistors 54 and 56, so as to properly interface with additional devices such as displays or data acquisition devices. Of course, the amplification circuit can be modified so as to suit the application in a known manner.

In order to allow digital processor 14 to fetch the proper offset and gain data, this data must be generated, experimentally or empirically, and stored as a look-up table in memory 16. The look-up table is indexed based upon a combination of the digital values of the measurement signal and the temperature signal output by A/D convertor 12. For example, the 8 most significant bits of the measurement value may be utilized as the least significant bits of the index address and the 8 most significant bits of the temperature value may be utilized as the most significant bits of the address. Therefore, memory 16 has, stored therein, a gain and offset value associated with each combination of values of measurement and temperature (which make up the address).

The look-up table may be generated from experimentally determined calibration data collected using an external calibration standard. The look-up table data entries are derived by calculating the offset and gain required at each index point to cause the nonlinear sensor output to correspond to the desired linear output over the operating range of the sensor. Each data entry in the look-up table thus consists of a gain correction and an offset correction which is applied to a small range of measurement and temperature values.

Figure 2:
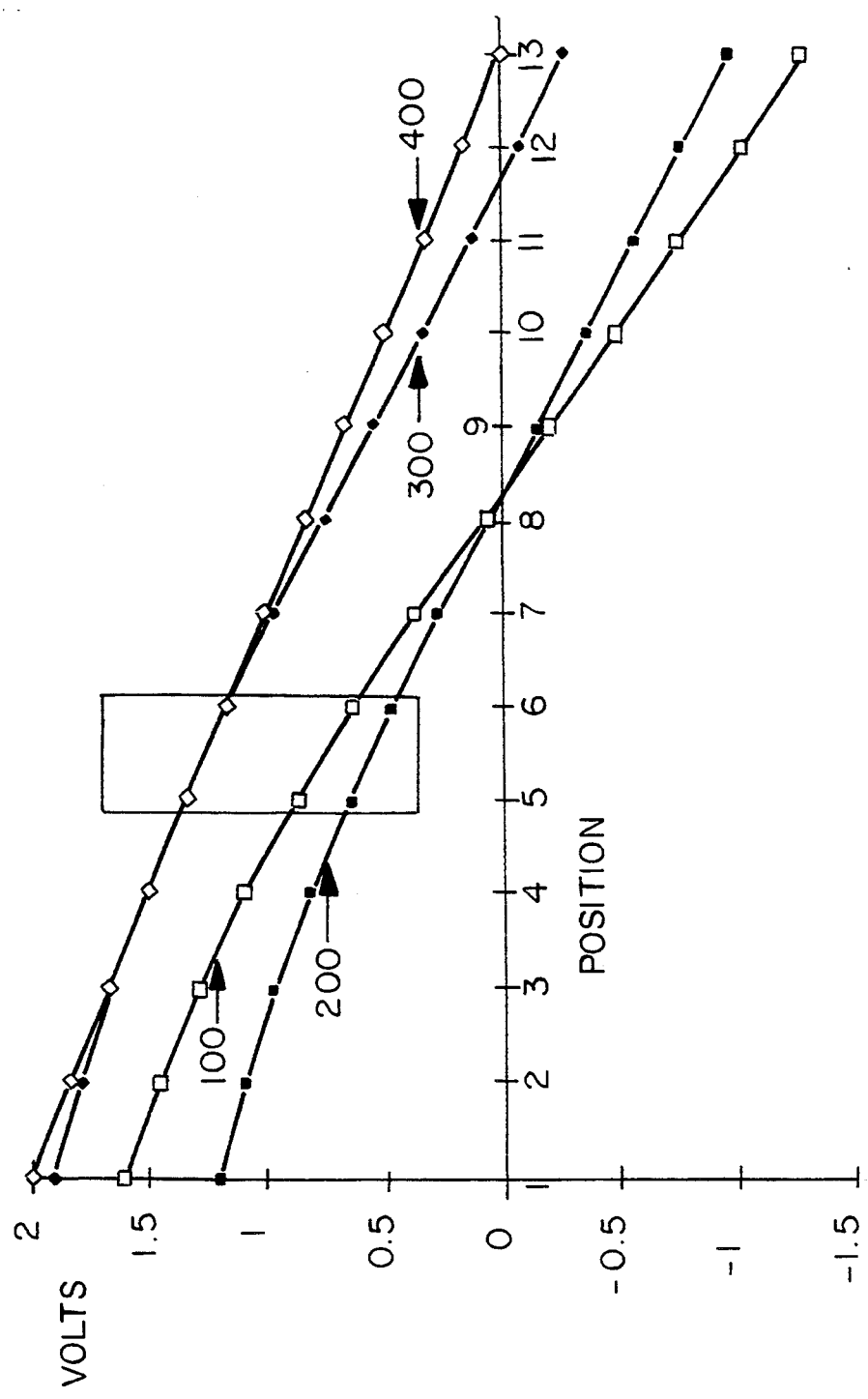
FIG. 2 is a graph illustrating the linearization of a measurement signal.

FIG. 2 illustrates the linearization of a measurement signal. Line 100 represents a typical nonlinear sensor output and line 400 represents a desired linear curve. The box marks an index range which is being linearized (one data entry will be stored in the look-up table for this range and a corresponding temperature signal range). The gain correction is calculated to make the slope of the sensor output the same as that of the desired linear curve. The gain correction is applied to the sensor output to yield gain corrected curve 200. Changing the gain causes the output to further deviate from the desired line 400. Accordingly, offset is calculated and added to line 200 so as to yield gain and offset corrected line 300 which is linear and substantially equivalent to the desired curve 400 over the index range.

This linearization process is repeated for each index range across the entire operating range of the sensor and across expected operating temperature ranges until the look-up table data is complete. It is apparent that the resolution of the linearization can be increased by decreasing the index range and generating more calibration points. The resolution is dictated by the desired accuracy and physical limitations of memory 16.

The detailed operation of the digitally controlled gain and offset amplifier will now be described with reference to FIG. 1. The digitally controlled offset and gain amplifier 20 is made up of dual multiplying current output D/A convertor 22 and differential amplifier 24. The negative input of amplifier 24 acts as a current to voltage convertor. The measurement signal, output from terminal 10-1 of sensor 10, is utilized as a reference input to D/A convertor 22 for the purpose of gain control. The current output at gain control terminal 22-1 of D/A convertor 22 is proportional to the product of the measurement signal and a digital gain word output from communications port 14-3 of the digital processor. Since the gain may vary from 0 to 1, the slope of the output at terminal 22-1 is always less than the slope of the measurement signal. Additional gain may be added to amplifier 24 simply by increasing the resistance value of feedback resistor Rf.

The offset control is implemented in a manner similar to the gain control. However, for offset control, the fixed voltage output of reference voltage supply 26 is utilized as a reference input to D/A convertor 22. Accordingly, the current output at offset terminal 22-2 is proportional to the product of the constant voltage output by voltage supply 26 and the digital offset word output from communications port 14-3 of digital processor 14. The varying offset current thus causes a varying offset voltage at the output of amplifier 24. It can be seen that the offset and gain corrections are implemented independently in the preferred embodiment. In other words, offset is not affected by gain changes and gain is not affected offset changes.

In order to more fully explain the preferred embodiment, the throughput of the system will now be summarized. The output of sensor 10 is a nonlinear analog voltage which is input to one input of A/D convertor 12 and one input of D/A convertor 22 of digitally controlled gain and offset amplifier 20. A temperature signal is input to another input of A/D convertor 12, A/D convertor 12 converts the measurement and temperature signals to a digital form and feeds the digital data to digital processor 14 which scales and mathematically matches the data to an index of the look-up table stored in memory 16. In the preferred embodiment, the mathematical matching requires only that the most significant bits of each data word (one corresponding to the measurement signal and one corresponding to the temperature signal) be combined into a one word address.

The look-up table contains data for the corresponding offset and gain corrections that has been previously derived from calibration data. Based upon this data, the sensor input is gain and offset adjusted in the digitally controlled gain and offset control amplifier as described above. No change in gain and offset occurs while the measurement and temperature signals remain within an index range corresponding to a single look-up table address. However, the resolution of the output of the device is not affected by the adjustments since the output is a function of the measurement signal from sensor 10 as well as the gain and offset adjustments. In fact, even if the digital processor fails and the gain and offset data words are not changed, the output would follow the measurement signal and the linearity of the output would match that of sensor 10. Also, the bandwidth of digital processor 14 and the look-up table stored in memory 30 only affects the range over which gain and offset corrections are made. The bandwidth of the analog output of the device is determined by the operational range of sensor 10 itself.

Based upon the above, it can be seen that the subject invention provides a method and device for linearizing an analog signal without adding phase delay, drift or instability. Also, the subject invention does not interfere with the throughput of the analog signal in any way.

The invention has been described through a preferred embodiment thereof. However, one skilled in the art will readily recognize that modifications may be made without departing from the scope of the invention as defined by the appended claims. For example, the analog signal to be corrected may originate from a sensor or any other device which generates an analog signal. Also, while temperature is utilized to correct for drift in the preferred embodiment, any other suitable parameter may be utilized. In fact, gain and offset corrections can be based upon only one parameter (the value of the signal to be corrected, for example) or a plurality of parameters which may affect linearity of the signal to be corrected. In such a situation, the look-up table must be generated and indexed accordingly. Also, instead of using look-up table, the offset and gain data may be calculated based upon predetermined algorithmic parameters.

What is claimed is:

1. A linearizing device comprising:
   an analog signal path;
   a digital processor, an output of said digital processor being coupled to said analog signal path;
   an analog to digital convertor having an output which is coupled to said digital processor;
   a measurement signal generating device coupled to said analog to digital convertor and said analog signal path; and
   a memory device associated with said digital processor, said memory device containing predetermined data which corresponds to a linearizing correction of an analog measurement signal which is generated by said measurement signal generating device, said linearizing correction being inserted into said analog signal path by said digital processor based upon the value of said measurement signal.

2. A linearizing device as claimed in claim 1, wherein said linearizing correction comprises a gain adjustment and an offset adjustment.

3. A linearizing device as claimed in claim 1, further comprising:
   an auxiliary signal generating device coupled to said analog to digital convertor, said linearizing correction being inserted into said analog signal path based upon values of said measurement signal and an auxiliary signal generated by said auxiliary signal generating device.

4. A linearizing device as claimed in claim 3, wherein said measurement signal is representative of a distance between said measurement signal generating device and a target object and said auxiliary signal is representative of the temperature of said measurement signal generating device.

5. A linearizing device as claimed in claim 1, said predetermined data being generated based upon an external calibration standard.

6. A linearizing device as claimed in claim 1, said predetermined data being stored as digital data words in the form of a look-up table, each of said data words being associated with an address which corresponds to a particular range of values of said measurement signal.

7. A linearizing device as claimed in claim 1, said predetermined data being stored in the form of algorithmic parameters.

8. A linearizing device as claimed in claim 3, said predetermined data being stored as digital data words in the form of a look-up table, each of said data words being associated with an address which corresponds to a particular range of values of said measurement signal and a particular range of values of said auxiliary signal.

9. A linearizing device as claimed in claim 2, said data being stored as algorithimic parameters, each of said parameters being associated with an address which corresponds to a particular range of values of said measurement signal and a particular range of values of said offset signal.

10. A linearizing device comprising:
    an analog signal path;
    a digital processor;
    an analog to digital convertor having an output which is coupled to said digital processor, an output of said digital processor being coupled to said analog signal path;
    a measurement signal generating device, which generates a measurement signal, coupled to said digital processor and said analog signal path; and
    means for determining a linearizing correction for an output of said measurement signal generating device, said means for determining being operatively connected to said digital processor, said linearizing correction being inserted into said analog signal path by said digital processor based upon the value of an output of said measurement signal generating device.

11. A linearizing device as claimed in claim 1, said analog signal path comprising:
    a dual multiplying digital to analog convertor coupled to said digital processor through a data bus so as to allow gain control words and offset control words to be sent to said digital to analog convertor, said measurement signal generating device being coupled to said digital to analog convertor, a product of a value of said measurement signal and a value of said gain control word being output at a gain control terminal of said digital to analog convertor, a product of said offset control word and a reference value being outputted at a gain control terminal of said digital to analog convertor;
    a differential amplifier having positive and negative terminals, said positive terminal being connected to a reference current source, said negative terminal being connected to said gain control terminal and said offset control terminal, an output of said differential amplifier being coupled to said digital to analog convertor.

12. A linearizing device as claimed in claim 10, said analog signal path comprising:
    a dual multiplying digital to analog convertor coupled to said digital processor through a data bus so as to allow gain control words and offset control words to be sent to said digital to analog convertor, said measurement signal generating device being coupled to said digital to analog convertor, a product of a value of said measurement signal and a value of said gain control word being output at a gain control terminal of said digital to analog convertor, a product of said offset control word and a reference value being outputted at a gain control terminal of said digital to analog convertor;
    a differential amplifier having positive and negative terminals, said positive terminal being connected to a reference current source, said negative terminal being connected to said gain control terminal and said offset control terminal, an output of said differential amplifier being coupled to said digital to analog convertor.

13. A method of linearizing an analog measurement signal, comprising the steps of:
    branching said measurement signal into an analog signal path and a control path;
    converting said measurement signal in said control path into a digital signal;
    retrieving digital gain and offset control words based upon a value of said digital signal;
    converting said gain and offset control words into analog gain and offset values respectively;
    combining said gain and offset values into said measurement signal in said analog signal path so as to linearize said measurement signal.

* * * * *